(12) United States Patent
Iwasaki

(10) Patent No.: US 6,711,287 B1
(45) Date of Patent: Mar. 23, 2004

(54) IMAGE-FEATURE EXTRACTION METHOD AND COMPUTER-READABLE RECORD MEDIUM WITH A PROGRAM FOR MAKING A COMPUTER EXECUTE STEPS OF THE METHOD RECORDED THEREIN

(75) Inventor: Masajiro Iwasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/459,633

(22) Filed: Dec. 13, 1999

(30) Foreign Application Priority Data

Dec. 21, 1998 (JP) ............................. 10-363462

(51) Int. Cl.$^7$ ................................. G06K 9/00
(52) U.S. Cl. ................ 382/165; 382/167; 382/168; 382/170; 382/171; 382/190
(58) Field of Search ................. 382/165, 164, 382/166, 167, 305, 190, 191, 192, 193, 194, 195, 168, 169, 170, 171, 172, 173, 174, 175, 176, 177, 224, 225; 358/538, 515, 516, 517, 518, 519, 520, 521, 522, 523, 524, 525, 526, 527, 528, 529, 530, 531, 532, 533, 534, 535, 536, 537, 539, 540; 345/597, 598, 599, 600, 601, 602, 603, 604, 605

(56) References Cited

U.S. PATENT DOCUMENTS 5,799,105 A * 8/1998 Tao .......................... 382/167
5,900,953 A * 5/1999 Bottou et al. ............... 358/540
6,088,137 A * 7/2000 Tomizawa ................... 358/538
6,141,444 A * 10/2000 Hasegawa ................... 382/175
6,516,100 B1 * 2/2003 Qian .......................... 382/305

OTHER PUBLICATIONS

"Query by Image and Video Content: The QBIC System", Myron Flickner et al., Computer (Sep. '95).

"Tools and Techniques for Color Image Retrieval", SPIE, vol. 2670 (Feb. '96).

* cited by examiner

Primary Examiner—Bhavesh M. Mehta
Assistant Examiner—Ali Bayat
(74) Attorney, Agent, or Firm—Dickstein Shapiro Morin & Oshinsky LLP

(57) ABSTRACT

An image-feature extraction method is realized by identifying to which area in a color space with a plurality of areas previously segmented thereinto each pixel belongs based on a color of each pixel which forms a prepared image; and generating a color histogram of the image based on a number of pixels which belong to each of the areas. When the generated color histogram is extracted as feature parameters representing features of the image, a color space suited to human sensibility on color and also a color space segmented into areas each suited to human sensibility on color are used as a color space.

24 Claims, 16 Drawing Sheets

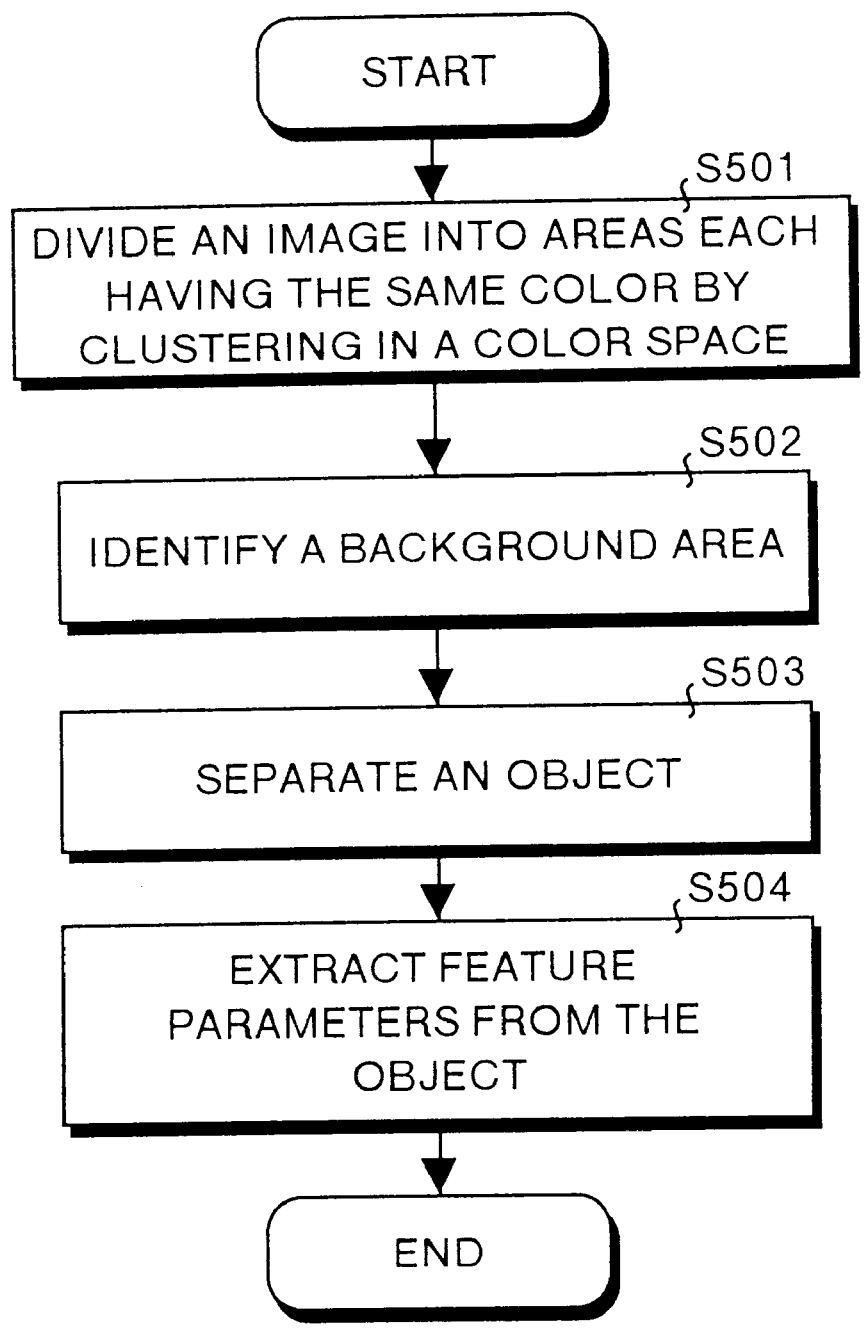

IMAGE-FEATURE EXTRACTION METHOD AND COMPUTER-READABLE RECORD MEDIUM WITH A PROGRAM FOR MAKING A COMPUTER EXECUTE STEPS OF THE METHOD RECORDED THEREIN

FIELD OF THE INVENTION

The present invention relates to an image-feature extraction method of extracting feature parameters representing features of an image from the image. More particularly, this invention relates to an image-feature extraction method of enabling extraction of image-feature parameters suited to human sensibility on similarity from the image and also of automating a work to extract feature parameters from the image when feature parameters representing features of an image are to be extracted from the image.

BACKGROUND OF THE INVENTION

Recently, in association with development of computer technology and image processing technology, accumulating enormous amount of electronic images to construct an image database have actively been attempted. When constructing such an image database, the most important thing is the availability of an image retrieval method so that a desired image can easily be acquired from a large number of accumulated images.

As one of the image retrieval methods as described above, there is one comprising the steps of allocating a search key with some term or terms to each image, verifying a keyword inputted in the same method as that for document retrieval with the search key allocated to the image, and returning the image with the search key matching the keyword as a search result.

However, an impression which a person from about an image varies from person to person. Therefore, a search key allocated to an image does not always cover every impression a person has from the image. Thus, so that there are many cases in which a satisfactory image can not be acquired in image retrieval using a search key based on terms inputted by an operator. The reason behind this is that, people can not find in many cases appropriate terms to express features concerning a shape of things such as a person, animal, or a building appearing in the image (which are collectively called as "object" hereafter) and a positional relation among the objects.

Therefore, an image should not be retrieved based on a result of verification of a keyword against a search key with terms, but it is desirable to construct a system so as to provide a particular image (described "query image") as a criteria for searching and enable retrieval of an image which is similar to the query image from the image database. To realize the retrieval method described above, there has been proposed a method in which feature parameters representing features of each image are retrieved from the query image as well as from an image as a target for retrieval, similarity between the feature parameters of the query image and those of the image as a target for retrieval are determined, and the image having the feature parameters similar to those of the query image is returned as a search result. Namely, this image retrieval method is a method of retrieving a similar image based on the idea that the similarity between features is equivalent to similarity between images themselves.

There are two papers that disclose such a retrieval method. The first paper discloses a query method of analyzing images themselves, extracting colors (a color histogram), texture, and shapes of objects or so in the images as feature parameters of each image to construct a database, and acquiring an image with specified feature parameters by specifying the feature parameters of the image in the database when the image is queried. This paper is by Myron Flickner et. al., "Query by Image and Video Content: The QBIC System" Computer, September 1995, pp 23–32.

The second paper discloses a method of retrieving a similar image by generating a color histogram of each image using a cylindrically-segmented HSV color space and by using the generated color histogram as feature parameters of each image. This paper is by John R. Smith and Shih-Fu Chang, "Tools and Techniques for Color Image Retrieval" SPIE, Vol. 2670, pp426–437.

With the image query method disclosed in the first paper, it is possible to query an image by using feature parameters of various images. However, when feature parameters are extracted from images and similarity between the images is determined based on the extracted feature parameters, the feature parameters do not fully cover the scale in which a human determines the similarity. Therefore, precision of retrieval is rather low. For example, feature parameters extracted based on the shape of an object only expresses how much the object resembles a circle (circularity) and in which direction the object is compressed (central moment). Namely, the extracted features are so rough that it is impossible to perform image query based on appropriate and detail impressions which a human has when looking at an object in the image. Further, there is a great possibility that the retrieval result contains noise.

Further, in the first paper, it is possible to perform image search based on a shape of an object as feature parameters of the image. However, a user is required to specify a locus of an edge of the object existing in the image when the object is extracted from the image. This requires an extra effort. An object in the image is one of the most noticeable feature when a person looks at the image. Therefore, by extracting a shape of an object as image-feature parameters and using the parameters for image retrieval, it is possible to perform high precision image retrieval based on the impressions which a human has from the image. However, as extra efforts are required, an enormous amount of manpower and time are required to construct an image database with a large amount of images accumulated therein.

In the second paper, the HSV color space used for extracting a color histogram from an image as feature parameters of the image is simply segmented into cylindrical shapes, so that some wastefully segmented areas are generated and increase in the amount of data is disadvantageously caused. More specifically, when there are a small number of segments in the color space, even colors dissimilar to each other may sometimes be determined as similar ones, and precision in determination of similarity between images gets worse. On the other hand, when a number of segments in the color space is too large, the amount of data for the color histogram becomes too much, and a long time is required for computing the similarity between the images. In addition, when the number of segments in the color space is too large, the colors which a human feels the same as or similar to each other may be determined as dissimilar ones. The method disclosed in the second paper corresponds to the case where the number of segments in the color space is too large, and the method includes the problems that a long time is required for computing similarity, and that human sensibility on feel are not sufficiently satisfied.

Namely, it may be said that, in the conventional technology, impressions which a human acquires from an image are not sufficiently reflected to feature parameters extracted from the image and an operational environment suited for use is not provided. For instance, a heavy work load is required for extracting feature parameters from an image. Further it may be said that, in the conventional technology, impressions which a human acquires from an image are not sufficiently reflected to features which are extracted from the image, and that it is difficult to acquire a result of retrieval as desired by an operator. In other words, in the conventional technology, attention is not focused on a human as an operator, and a user-friendly environment for working is not provided. To improve convenience in working, feature parameters should be extracted from an image without requiring manpower, and the extracted feature parameters should be suited to human sensibility on similarity, and whether a retrieved image completely or substantially satisfies the conditions for searching set by a human should be determined based on human sensibility on similarity.

SUMMARY OF THE INVENTION

It is an object of the present invention to automate, when feature parameters representing features of an image are extracted from an image, the work of extracting feature parameters therefrom, and to enable extraction of feature parameters suited to human sensibility on similarity without requiring any specific work load to an operator.

It is another object of the present invention to improve precision in image retrieval by making it possible to extract image-feature parameters suited to human sensibility on similarity for acquiring a result of image retrieval suited to human sensibility on similarity.

It is still another object of the present invention to speed up image retrieval by segmenting a color space into a plurality of areas suited to human sensibility on color, when a color histogram is extracted from the image as image-feature parameters, for suppressing a number of segmented color spaces to the minimum level, and also by using a color histogram.

An image parameter extraction method according to one aspect of the present invention comprises the steps of identifying to which area in a color space with a plurality of areas previously segmented thereinto each pixel belongs based on a color of each pixel which forms a prepared image; and generating a color histogram of the image based on the number of pixels which belong to each of the areas. When the generated color histogram is extracted as feature parameters representing features of the image, a color space which is suited to human sensibility on color and also which is segmented into areas each suited to human sensibility on color is used as a color space. Since the color space suited to human sensibility on color is used from the initial step, image-feature parameters suited to human sensibility on similarity can be extracted without requiring any heavy work load to an operator.

An image-feature extraction method according to another aspect of the present invention comprises the steps of identifying to which area in a color space with a plurality of areas previously segmented thereinto each pixel belongs based on a color of each pixel which forms a prepared image; generating a color histogram of the image based on the number of pixels which belong to each of the areas; when the generated color histogram is extracted as feature parameters representing features of the image then accumulating a number of pixels belonging to other areas in the number of pixels belonging to each of the areas according to color similarity between the areas; and generating a color histogram based on the number of pixels belonging to each of the areas after accumulation thereof. Since a correlation between bins can automatically be checked and identified by a program, image-feature parameters suited to human sensibility on similarity can be extracted without requiring any heavy work load to an operator.

An image feature extraction method according to still another aspect of the present invention comprise the steps of identifying to which area in color space with a plurality of areas previously segmented thereinto each pixel belongs based on a color of each pixel which forms a prepared image; generating a color histogram of the image based on the number of pixels belonging to each of the areas; when the generated color histogram is extracted as feature parameters representing features of the image then previously setting a typical color of each of the areas; computing similarity between a color of each pixel and a typical color of each area; and determining a number of pixels which belong to each of the areas according to the computed similarity. Since a correlation between bins in the above-described method can automatically be checked and identified by a program, image-feature parameters suited to human sensibility on similarity can be extracted without requiring any heavy work load to an operator.

The image feature extraction method according to still another aspect of the present invention comprises the steps of extracting an object from a prepared image; when feature parameters representing features of an object are extracted from the extracted object then setting points evenly spaced along an outline of the extracted object; computing displacement of an angle formed with lines linking between adjacent points; and extracting each computed displacement of the angles as feature parameters of the object. Since feature parameters of an object can automatically be extracted by a program in the method as described above, image-feature parameters satisfying human sensibility on similarity can be extracted without requiring any heavy work load to an operator.

The image-feature extraction method according to another aspect of the present invention comprises the steps of extracting an object from a prepared image; when feature parameters representing features of an object are extracted from the extracted object then extracting a color of each pixel which forms the image and clustering the colors in a color space; identifying any of the clusters obtained by the clustering including a color appearing most frequently in a previously specified area of the image as a cluster for a background area of the image; and extracting an area of the image formed with colors which belong to the clusters other than the identified cluster as an object. Therefore the work to extract image-feature parameters from the image can be automated.

A program for making a computer execute the steps of the image-feature extraction method as described above is recorded in a computer-readable record medium. Therefore, through execution of the program by a computer, image-feature parameters suited to human sensibility on colors can be extracted, and also a high precision result of retrieval satisfying human sensibility on similarity can be obtained by using the extracted feature parameters.

Other objects and features of this invention will become apparent from the following description with reference to the accompanying drawings.

BRIEF DESCRIPTION OF THE DRAWINGS

FIG. 12 is a flow chart showing an image-feature extraction method according to a third embodiment of the present invention;

FIG. 13A to FIG. 13D explains the processing in step S503 of FIG. 12;

DESCRIPTION OF THE PREFERRED EMBODIMENTS

Preferred embodiments of the image-feature extraction method according to the present invention are described in detail below with reference to the attached drawings. In the embodiments described below, the image-feature extraction method according to the present invention is described as one function of an image retrieval system.

Figure 1:
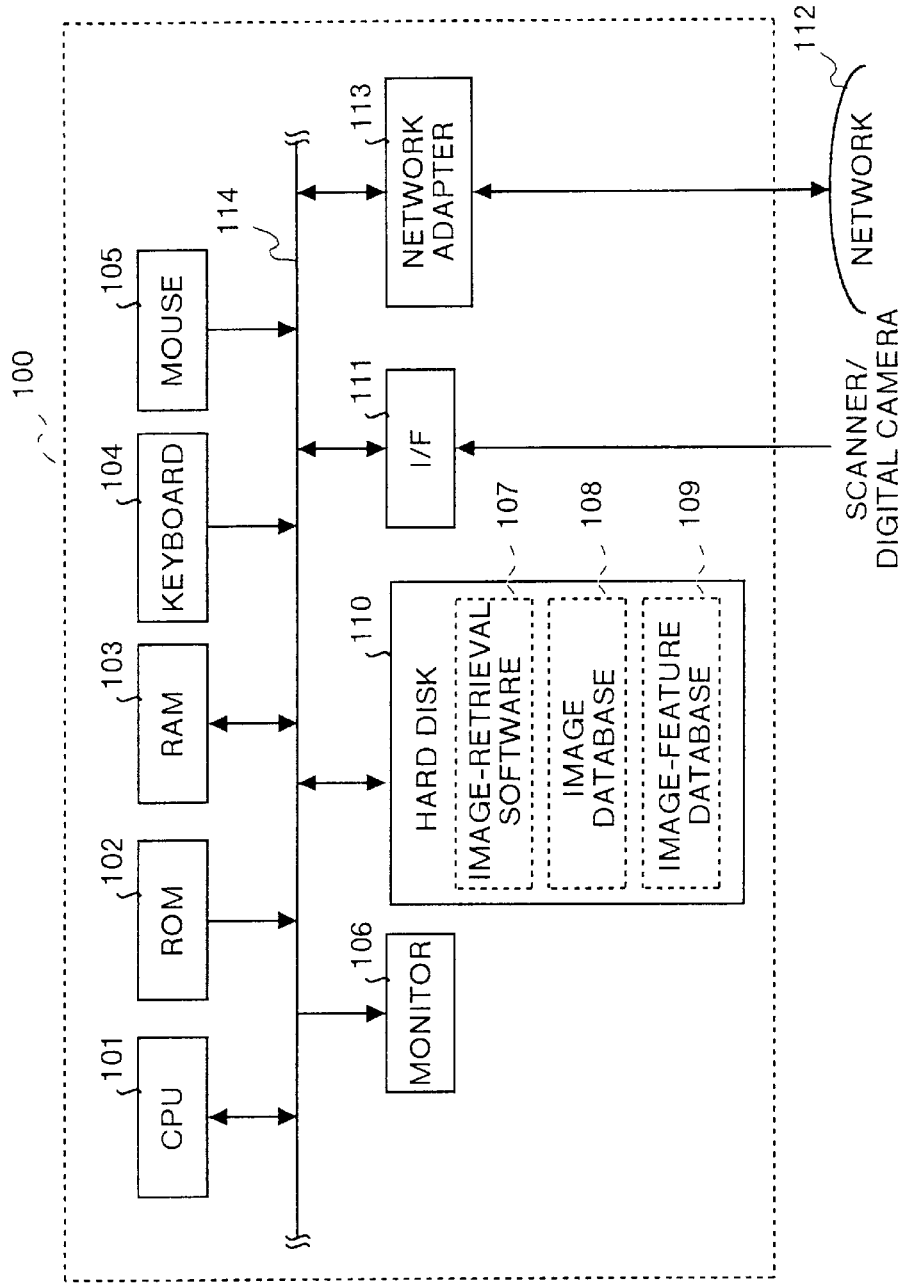
FIG. 1 is a block diagram showing configuration of an image retrieval system which realizes the image-feature extraction method according to the present invention.

FIG. 1 is a block diagram showing configuration of an image retrieval system which realizes an image-feature extraction method according to a first embodiment. The image retrieval system 100 shown in FIG. 1 is realized using a personal computer or a work station. The image retrieval system 100 comprises a CPU 101 which controls the whole system, a ROM 102 which stores therein a boot program or so, a RAM 103 used as a work area of the CPU 101, a keyboard 104 and a mouse 105 used for entry of a query image and an instruction for execution of retrieval or the like, a monitor 106 such as a CRT or a liquid crystal display for displaying, for instance, an image as a search result thereon. Further, a hard disk 110 which stores therein image retrieval software 107 which has functions of executing steps in the image-feature extraction method according to the present invention, an image database 108 with a plurality of images registered therein, a an image-feature database 109 with features extracted from the images in the image database 108 registered therein is also provided. Further, an interface (I/F) 111 for connecting a scanner or a digital camera which inputs an image into the system thereto, a network adapter 113 for connecting the image retrieval system 100 to a network 112 such as the Internet and a LAN, and a bus 114 for connecting the above-described sections to each other are provided.

Figure 2:
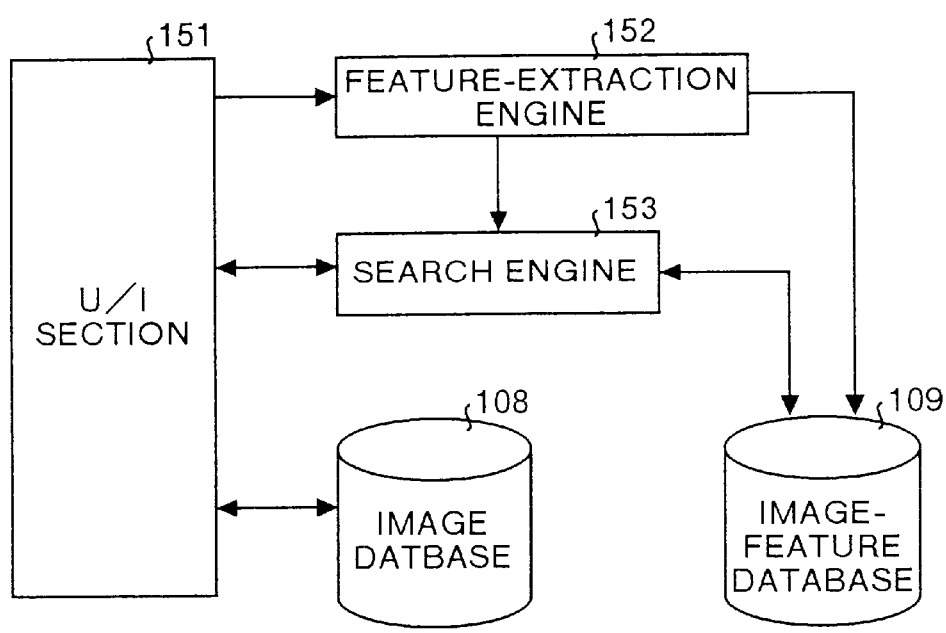
FIG. 2 is a block diagram showing the processing executed in the image retrieval system shown in FIG. 1.

FIG. 2 shows the processing executed in the image retrieval system shown in FIG. 1 in the from of a block diagram. Although contents of the processing will be described in detail later, in FIG. 2, a user interface (U/I) section 151 displays thereon a screen such as a search-conditions entry screen for performing image retrieval for a user and a search result display screen, and executes the processing of entering search conditions and outputting a search result or the like. A feature-extraction engine 152 executes processing of extracting image-feature parameters from an image to be registered in the image database 108 as well as from a query image. The processing executed by the feature-extraction engine 152 is the main feature of the present invention. Further, a search engine 153 executes the processing of comparing feature parameters extracted from a query image to any of feature parameters registered in the image-feature database 109 and searching any image having features corresponding to the features of the query image.

In FIG. 2, the U/I section 151, feature-extraction engine 152, and search engine 153 represent the modules which form the image retrieval software 107 shown in FIG. 1. The processing executed by these sections is realized when the CPU 101 shown in FIG. 1 executes the image retrieval software 107.

The processing of extracting the image features executed by the image retrieval system 100 having the configuration described above is described below in the following order:

(1) General contents of the processing for image registration and image retrieval (2) Processing for color-feature extraction (1) General Contents of the Processing for Image Registration and Image Retrieval At first, general contents of the processing for image registration and image retrieval is described, and then as an example thereof, a case in which the image-feature extraction method according to the present invention is used is explained.

The image retrieval system 100 executes the processing for retrieving an image similar to a query image from the image database 108 with a plurality of images registered therein. Namely, the system executes the processing for retrieving an image based on the similarity between the images. The similarity as defined herein means how similar some feature parameters extracted from images are to each other.

Figure 3:
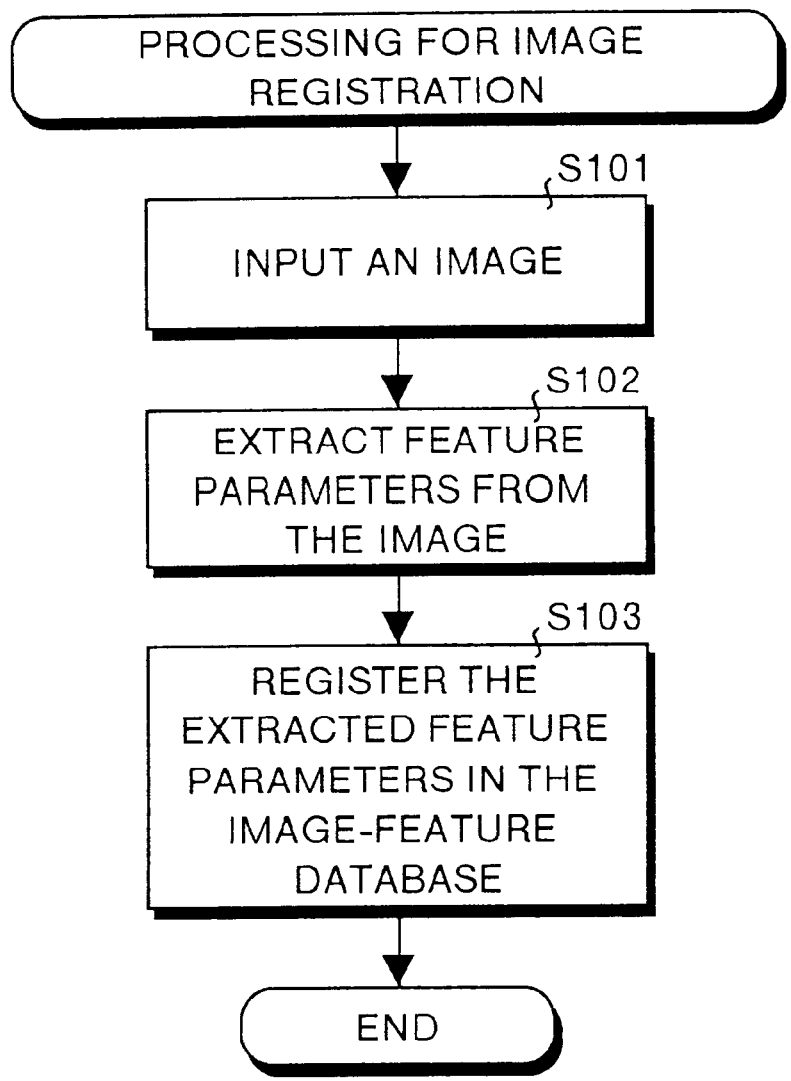
FIG. 3 is a flow chart showing general contents of the processing for image registration executed in the image retrieval system shown in FIG. 1.

FIG. 3 is a flow chart showing general contents of the processing of image registration executed in the image retrieval system 100. The feature-extraction engine 152 shown in FIG. 2 receives an image as a target for registration via the U/I section 151 (step S101). The image that is inputted may be an image scanned using a scanner it or may be an image photographed using a digital camera, or it may be an image downloaded via the network 112, or it may be an image previously stored in the hard disk 110. The feature-extraction engine 152 executes the processing for extracting image-feature parameters from the inputted image (step S102). In step S102, the processing for image-feature extraction according to the present invention is applied. What exactly are the extracted feature parameters is described in detail later.

The feature-extraction engine 152 then registers the extracted feature parameters in the image-feature database 109 by correlating the parameters to the original image registered in the image database 108 (step S103).

It is preferable, from the view point of image retrieval at a higher speed, to previously extract image-feature parameters when registering it and register the image-feature parameters in the image-feature database 109. However, when image-feature parameters are to be extracted from each image as a target for retrieval at the time of image retrieval, it is not necessary to previously extract image-feature parameters.

By executing the process shown in FIG. 3, the images registered in the image database 108 are mapped in the feature space based on the extracted feature parameters. When image retrieval is required, image-feature parameters are extracted from a query image described later, and the extracted feature parameters are mapped in the feature space shown in FIG. 4. Points (black points) shown in FIG. 4 show images mapped in the feature space, and a space between the point of the query image and a point of each image shows similarity between the images.

Figure 5:
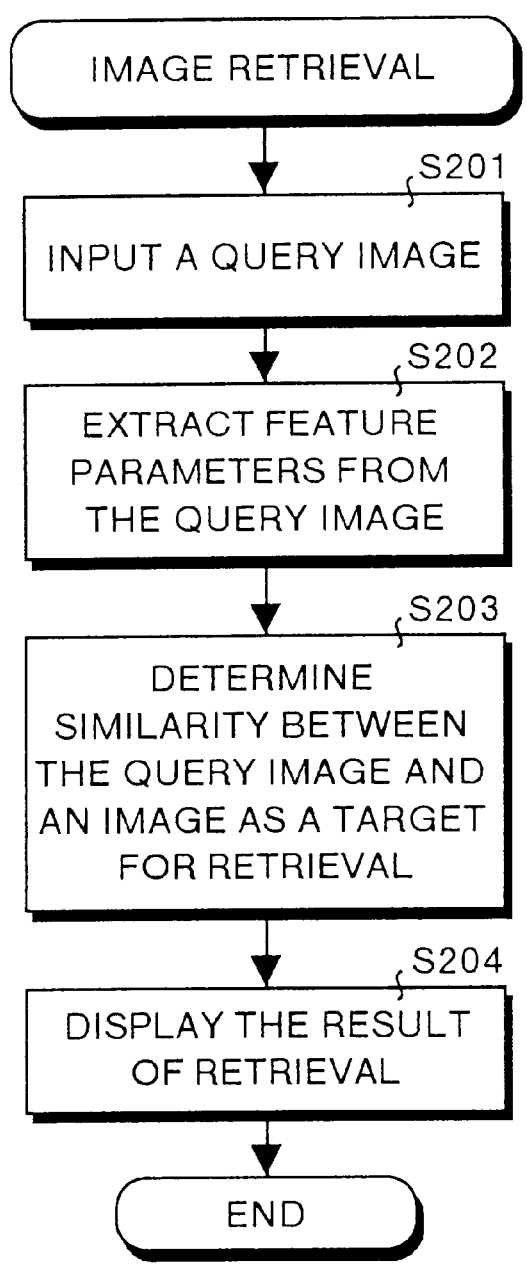
FIG. 5 is a flow chart showing general contents of the processing for image retrieval executed in the image retrieval system shown in FIG. 1.

FIG. 5 is a flow chart showing general contents of the processing of image retrieval executed in the image retrieval system 100. It is assumed here that feature parameters of all the images in the image database 108 as targets for retrieval are registered in the image-feature database 109.

The feature-extraction engine 152 in FIG. 2 receives a query image via the U/I section 151 (step S201), and extracts image-feature parameters from the received query image in the same manner as in step S102 of FIG. 3 (step S202) In this step S202, the processing for image-feature extraction according to the present invention is applied. The feature-extraction engine 152 then transmits the extracted feature parameters of the query image to the search engine 153 (The parameters are mapped in the feature space in FIG. 4).

Figure 4:
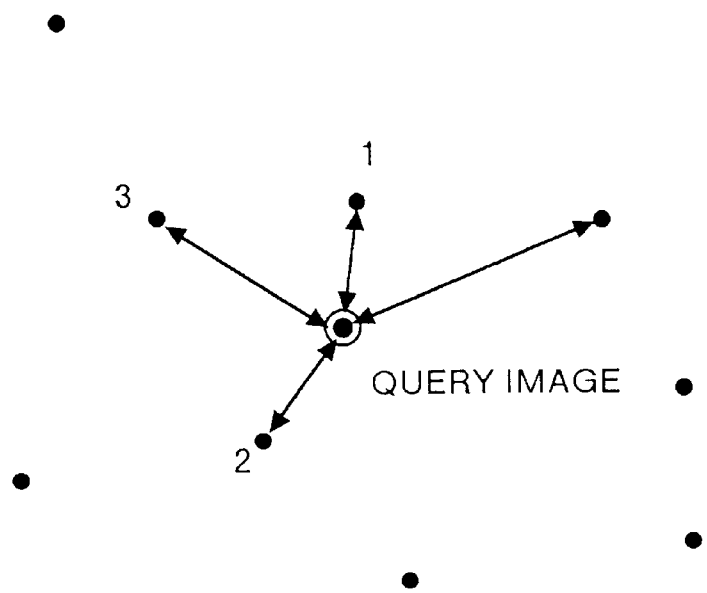
FIG. 4 is an explanatory view showing a state where images are mapped in a feature space based on extracted image features in the image-feature extraction method according to the present invention.

The search engine 153 computes a space between the point of query image and a point of an image as a target for retrieval mapped in the feature space shown in FIG. 4 and computes similarity between the query image and the image as a target for retrieval (step S203).

Image-parameters are in most cases vector data, so that an equation on definition of vector space such as an Euclidean range is generally used for computing a space between points indicating similarity. A particular space can be defined according to types of image-feature parameters.

The U/I section 151 receives the similarity computed in the search engine 153, and displays a search result based on the received similarity (step S204). For example, the U/I section 151 generates a list with images as search results arranged in order of similarity based on the similarity received from the search engine 153, and displays the list together with thumbnail images on the monitor 106.

When any image that is registered in the image database 108 and whose image-feature parameters are registered in the image-feature database 109 is used as a query image, the processing in step S202 of FIG. 5 can be skipped.

(2) Processing for Color-Feature Extraction

The processing for image-feature extraction specified to the present invention is described more specifically. In the first embodiment, the processing for extracting color features (color histogram) forming an image as image-feature parameters is explained.

As one of parameters with which similarity between the images can be determined, the colors in the image is an important parameter. In a case of a natural image with various objects mixed therein, it is difficult to concentrate attentions on one of the objects, which makes the system insensitive to features of a shape of each object. Under these circumstances, the colors in the image become more important. When the colors in the image are to be extracted as image-feature parameters, a method of generating a color histogram of the image and determining the generated color histogram as image-feature parameters has generally been employed.

In the conventional method, generation of data for a color histogram is realized by selecting an appropriate color space (e.g., Lab, Luv, or HSV in general) and segmenting the selected color space into a plurality of areas. Each segment of the histogram corresponding to each area obtained by segmenting the color space is referred to as Bin, and which area of the color space corresponding to each bin each pixel corresponds to is checked. A number of pixels in each bin is normalized according o the whole number of pixels (to form a color histogram), and the normalized number of pixels is used as feature parameters used for image retrieval.

In Lab and Luv, the color difference is defined on the other hand, and the scale appropriate for human sensibility is only lightness (L). Therefore it is difficult to make adjustment such that a size of each area corresponding to a bin is changed to satisfy human sensibility on chroma and hue. HSV is a color space close to human sensibility including value (V), saturation (step S), and hue (H), and it is easy to adjust a size of each area corresponding to a bin. Therefore, a method of using HSV (Visual SEEK) as a color space like that in the second paper described above as a conventional technology has been proposed. Actual data distribution in this method shows a cylindrical shape as shown in FIG. 6, in which the lower side is black and the upper side is white.

Figure 6:
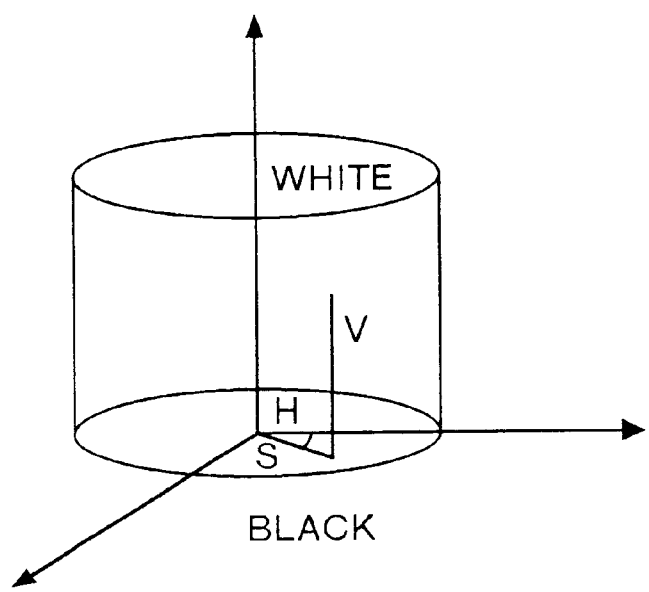
FIG. 6 is an explanatory view showing an HSV color space.
Figure 7:
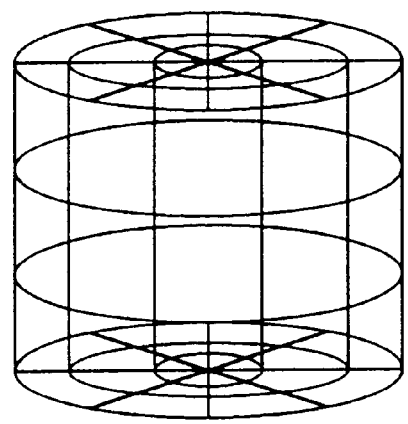
FIG. 7 is an explanatory view showing areas corresponding to bins of the conventional type of color histogram.

In the conventional method, as shown in FIG. 7, the cylindrical color space shown in FIG. 6 is segmented just like cylinders and sectors of a disk to generate areas corresponding to bins of the color histogram. However, in the color space shown in FIG. 7, a degree of color discrimination by humans becomes lower toward the upper and lower ends thereof, so that there is no need for areas corresponding to bins in the same numbers as those at the central part thereof. Namely, even colors that a person thinks as black color are unnecessarily divided into areas corresponding to different bins in the color space shown in FIG. 7, and are handled as different colors. In addition, if areas corresponding to bins are excessively prepared, not only the amount of data increases but also the speed in computing the similarity decreases.

Figure 8:
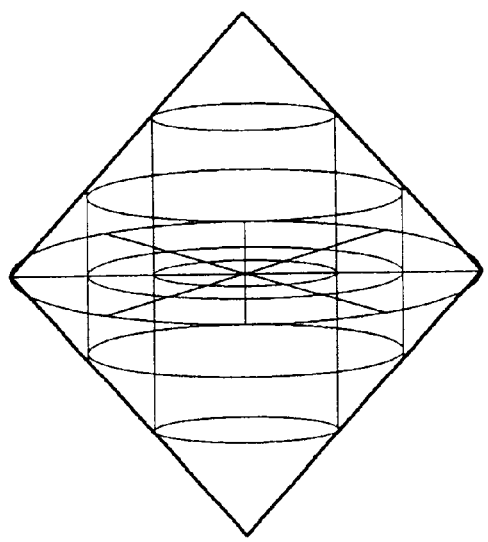
FIG. 8 is an explanatory view showing a color space and bins used in the image-feature extraction method according to a first embodiment of the present invention.

Therefore, in the present invention, a bi-hexagonal spindle model of HSV is used as a color space. More specifically, both ends of the cylinder are thinned to generate a biconical color space as shown in FIG. 8, for example, and the generated color space is segmented. More specifically, the color space is segmented based on a plurality of concentric circles around the lightness axis on a lightness-uniform surface as well as on a plurality of lines radiated from the lightness axis. The color space is further segmented based on a plurality of lightness-uniform surfaces. By dividing the color space as shown in FIG. 8, areas corresponding to the bins are made closer to human sensibility on color, which allows optimal feature parameters to be extracted with a minimum number of areas.

The processing for generation of a color histogram using the segmented color space and extracting the histogram as image-feature parameters as shown in FIG. 8 is briefly described below.

Figure 9:
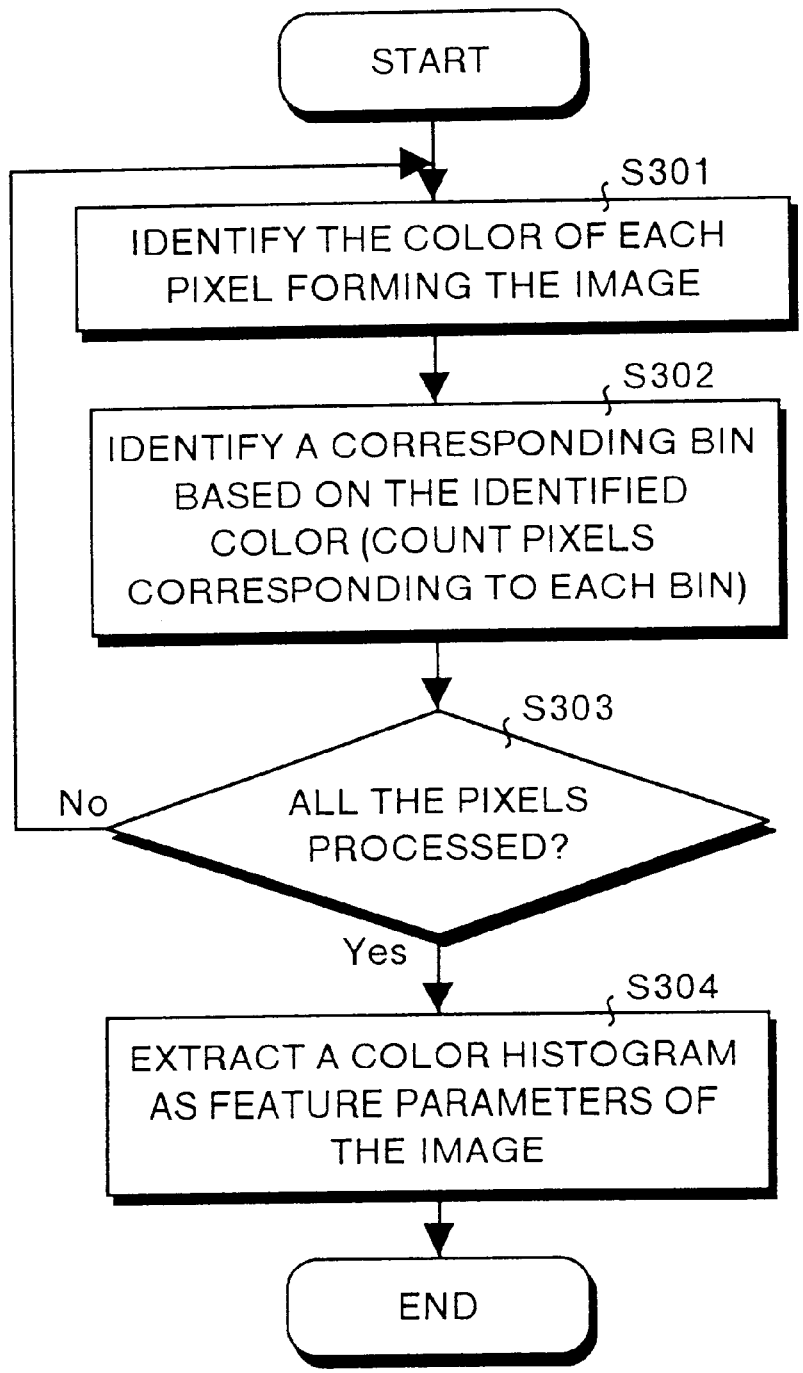
FIG. 9 is a flow chart showing processing of extracting a color histogram as image-feature parameters in the image-feature extraction method according to the first embodiment of the present invention.

FIG. 9 is a flow chart showing the processing of extracting a color histogram as image-feature parameters. The processing shown in FIG. 9 is executed, for example, in step S102 of FIG. 3 and in step S202 of FIG. 5. It is assumed herein hat the segmented color space as shown in FIG. 8 is set as a color space.

The feature-extraction engine 152 in FIG. 2 identifies a color of each pixel forming an image as a target whose feature parameters are to be extracted (step S301), checks which area corresponding to any bin in the color space of FIG. 8 each pixel corresponds to based on the identified color, and identifies the area corresponding to the bin (step S302). In step S302, a number of corresponding pixels are counted for each bin (Each pixel in the image is allocated to the corresponding bin).

The feature-extraction engine 152 determines whether the processing in steps S301 and S302 has been executed for all the pixels in the image or not (step S303). When it is determined that the processing has not been finished for all of the pixels, the processing in step S301 is repeated. On the other hand, when it is determined that the processing has been finished for all of the pixels, the feature-extraction engine 152 normalizes a number of pixels for each bin to generate a color histogram, extracts the generated color histogram as image-feature parameters (step S304), and ends the processing.

When image retrieval is performed by using the color histogram obtained as described above, the search engine 153 computes the similarity between the images by comparing corresponding bins to each other checking the color histogram for a query image and that for the image as a target for retrieval (Refer to step S203 in FIG. 5). In this step, as described in FIG. 8, the number of bins is suppressed to the minimum number, so that a computing speed in obtaining the similarity can be improved. In addition, as each bin has a feature that it substantially satisfies human sensibility on color, any image obtained as a search result is suited to human sensibility on color.

As described above, with the image-feature extraction method according to the first embodiment, when a color histogram is to be extracted as feature parameters of an image, a color space which is segmented into areas corresponding to bins each as a unit suited to the sense of color which a human has is used. Therefore, it is possible to extract a color histogram suited to human sensibility on color as feature parameters of an image. Thus, the processing of image retrieval suited to human sensibility on color can be realized through retrieval of an image by using this color histogram. Further, a number of bins is suppressed to a minimum, so that a computing speed required when similarity between images is computed by using a color histogram can be improved.

Processing for image-feature extraction according to a second embodiment of the present invention is described below. In the second embodiment, like in the first embodiment, the processing for extracting a color histogram as image-feature parameters is described. As configuration of the image retrieval system 100 and that of the image retrieval software 107 are already described in the first embodiment with reference to FIG. 1 and FIG. 2, to avoid repetition, its description is omitted.

When image retrieval is performed by using a color histogram, the Euclidean range in a feature space and a quadratic-form range as expressed by Equation 1 described below can be used as similarity between images for a color histogram extracted from each image.

$$D(X, Y) = \sum_{i=1}^{N} \sum_{j=1}^{N} a_{ij}(X_i - Y_i)(X_j - Y_j) \tag{1}$$

wherein $a_{ij}$ indicates the similarity between an i-th bin and a j-th bin, and $X_i$, $Y_i$ indicates a bin in an i-th histogram.

When the Euclidean range is employed, color similarity between bins is ignored. Therefore, when the similarity between an image only in red color and an image only in orange color is determined, if red and orange colors are allocated to different bins respectively, it is determined that both of the images are completely different. On the other hand, when the quadratic-form range is employed, a correlation between bins is taken into considerations, so that red and orange can appropriately be determined. However, when the quadratic-form range is used, it takes a longer time for computation because a correlation between bins needs to be checked. In addition, there is the tendency that a result not satisfying human sensibility on similarity is provided also when a number of colors forming an image is small.

For solving the problems described above, in the second embodiment, a correlation histogram is generated by taking into considerations the similarity between bins as shown in equation 2 described below when a color histogram is generated. In equation 2, $C_i$ is a bin in an i-th correlation histogram and $H_i$ is a bin in an ordinary histogram.

$$C_i = \frac{X_i}{M} \tag{2}$$

$$X_i = \sum_{j=1}^{N} a_{ij} \times H_j$$

$$M = \sum_{j=1}^{N} X_j \tag{3}$$

In equation 3, $a_{ij}$ is the similarity between an i-th bin and a j-th bin, which is expressed by 1-d ($O_i$, $O_j$), and d ($O_i$, $O_j$) is represented with a value of 0 to 1 expressing a color difference between colors $O_i$ and $O_j$ (dissimilarity between colors), and herein 0 means that both colors are the same while 1 means that both colors are completely different.

Similarity between the images can be computed based on the high-speed Euclidean range from the histogram obtained as described above. Namely, as the correlation between bins has already been considered when the color histogram is generated, it is required only to compare the bins one by one when computing the similarity. As a result, the need for considering a correlation between bins can be eliminated when similarity is computed, thus a higher speed in computing similarity being realized. In addition, a color histogram based on considerations to a correlation between bins can be generated, which makes it possible to realize retrieval suited to human sensibility on color.

Figure 10:
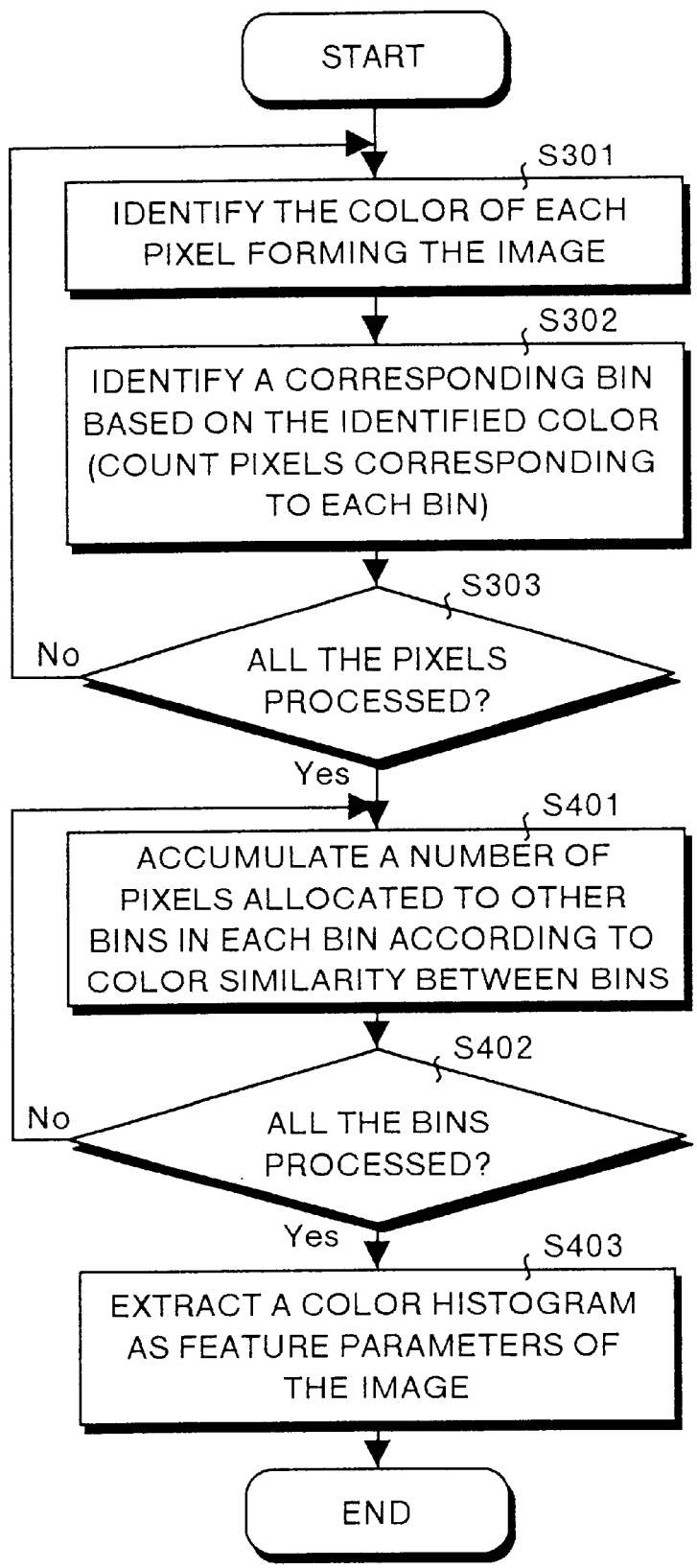
FIG. 10 is a flow chart showing the processing for extracting a color histogram as image-feature parameters in an image-feature extraction method according to a second embodiment of the present invention.

Further, the processing for generating a color histogram based on the above-described equations 2 and 3 is described below. FIG. 10 is a flow chart showing the processing of extracting a color histogram as image-feature parameters. It is assumed herein that the processing shown in FIG. 10 is executed, for example, in step S102 of FIG. 3 and in step S202 of FIG. 5. The same step numbers are assigned to steps corresponding to those in FIG. 9, and their detailed description will be omitted. As a color space, the color space segmented as shown in FIG. 8 may be used, or the conventional color space as shown in FIG. 7 may also be used.

The feature-extraction engine 152 in FIG. 2 identifies a color of each pixel forming an image as a target whose feature parameters are to be extracted (step S301), checks which bin in a color space each pixel corresponds to based on the identified color, and identifies the corresponding bin (step S302: each pixel in the image is allocated to a corresponding bin). The feature-extraction engine 152 determines whether the processing in steps S301 and S302 has been executed for all the pixels in the image (step S303).

When it is determined that the processing has been finished for all the pixels, the feature-extraction engine 152 accumulates a number of pixels allocated to other bins in each bin respectively based on the color similarity between bins (step S401). The processing in the step S401 will be described later with reference to the related drawing.

In the next step, the feature-extraction engine 152 determines whether the processing in step S401 has been executed for all the bins or not (step S402). When it is determined that the processing has not been finished for all the bins, the processing in step S401 is repeated. On the other hand, when it is determined that the processing has been finished for all the bins, the feature-extraction engine 152 extracts a color histogram as image-feature parameters (step S403), and ends the processing.

Figure 11A:
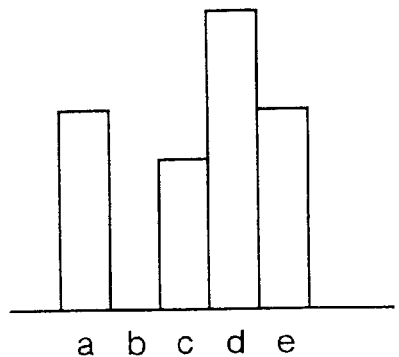
FIG. 11A to FIG. 11C explains the processing in step S401 of FIG. 10.
Figure 11B:
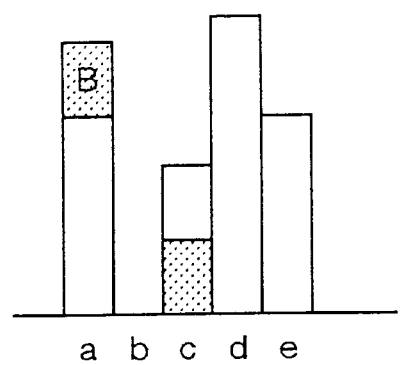
Figure 11C:
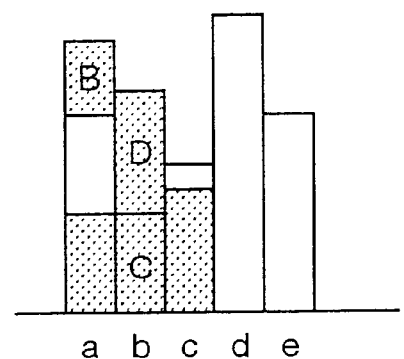

General contents of the processing in the above-described step S401 is described with reference to FIG. 11A to FIG. 11C. In these figures, it is assumed that a number of bins is set to five of bin a to bin e and the height of each of the bin corresponds to a number of pixels allocated to that bin. FIG. 11A shows a state of each bin before the processing in step S401 is executed, in which it is assumed as a result of search that here is no pixel corresponding to the bin b.

At first, the processing in step S401 is executed to the bin a. It is assumed herein that the bin a is similar to the bin b at a degree of similarity A and similar to the bin c at a degree of similarity B, but is not similar to the other bins. At first, for the pixels allocated to the bin b, the processing for accumulating the pixels according to the degree of similarity A is executed to the bin a. However, as the number of pixels allocated to the bin b is 0, there is no pixel to be accumulated in the bin a. In the next step, for the pixels allocated to the bin c, the processing for accumulating the pixels according to the degree of similarity B is executed to the bin a. FIG. 11B shows the result of accumulation of the pixels of the bin c according to the degree of similarity B in the bin a.

Similarly, the processing in step S401 is executed to the bin b. It is assumed herein that the bin b is similar to the bin a at a degree of similarity C and similar to the bin c at a degree of similarity D, but is not similar to the other bins. At first, for the pixels allocated to the bin a, the processing for accumulating the pixels according to the degree of similarity C is executed to the bin b. In the next step, for the pixels allocated to the bin c, the processing for accumulating the pixels according to the degree of similarity D is executed to the bin b. FIG. 11C shows results of accumulation of the pixels of the bin a according to the degree of similarity C in the bin b and also of accumulation of the pixels of the bin c according to the degree of similarity D in the bin b.

The processing as described with reference to FIG. 11 is executed in steps S401 and S402 of FIG. 10 with respect to all the bins. The color histogram generated as described above corresponds to the correlation histogram previously mentioned.

As described above with reference to FIG. 11A to FIG. 11C, in the generated correlation histogram, pixels in other bins are allocated to even a bin where there is no corresponding pixel according to each degree of similarity with the other bins. Therefore, when similarity between an image only in red color and an image only in orange color is determined, even if red and orange are allocated to different bins, it is possible to obtain similarly-shaped histograms from the two images by generating the correlation histogram described in the second embodiment. Accordingly, even if the bins are simply compared to each other one to one, it is determined that the two images are similar to each other.

As described above, with the image-feature extraction method according to the second embodiment, by accumulating pixels of other bins in each bin according to a degree of similarity between the bin and each of the other bins, a correlation between the bins is reflected to the generated color histogram. Therefore, a retrieval suited to human sensibility on color can be performed. In addition, the correlation between bins is reflected to the generated color histogram. Therefore, when similarity between images is computed, the bins may simply be compared to each other one to one, so that the similarity can be determined at a higher speed.

In the second embodiment, when a correlation histogram is to be generated, an ordinary color histogram is generated once and then a correlation histogram is generated. By using the method described below in place of the above-described method, however, it is possible to generate a higher-precision correlation histogram. More specifically, the method comprises the steps of previously setting a typical color of each bin, counting a number of pixels in each bin based on each space between a color of each pixel in an image and each of all the typical colors, and generating a correlation histogram. Namely, each bin is represented by Equation 4 described below.

$$C_i = \sum_{j=1}^{L} \{1 - d(P_j, R_i)\} \tag{4}$$

wherein $P_j$ is a color of a j-th pixel in an image and $R_i$ is a typical color of an i-th bin. A value d $(P_j, R_i)$ is represented with a value of 0 to 1 expressing a color difference between colors $P_j$ and $R_i$ (dissimilarity between colors), in which 0 means that both colors are the same and 1 means that both colors are completely different.

Namely, executed in this method is the processing for previously setting typical colors of bins, computing similarity between a color of each pixel and a typical color of each bin, and counting a number of pixels belonging to each bin according to the computed similarity. Therefore, a correlation histogram described in the second embodiment can be generated without the need for generating an ordinary color histogram. With this method, by previously determining typical colors of bins, pixels similar to any of the typical colors can be counted without fail, so that a higher-precision correlation histogram can be generated.

An image-feature extraction method according to a third embodiment of the present invention is described below. In the above-described first and second embodiments, although the processing for extracting feature parameters of a whole image is described, in the third embodiment, the processing for extracting an object in an image and further extracting feature parameters for the extracted object is described. Namely, by extracting feature parameters not from a whole image but from each of objects and further extracting feature parameters for each extracted object, it is possible to compute similarity between objects, and image retrieval by object can be performed.

As configuration of the image retrieval system 100 and image retrieval software 107 is as already described in the first embodiment with reference to FIG. 1 and FIG. 2, the processing of image-feature extraction is described herein centering on processing for extracting an object.

Technologically it is extremely difficult to extract only a specified object from an image such as an ordinary photo, namely an image in which various types of object are present. To solve the problem, in a third embodiment of the present invention, by determining an image whose background is formed with a substantially single color as an image whose features are to be extracted and extracting a single-colored section from the image, the background is removed and an object is extracted.

The image-feature extraction method according to the third embodiment is described below more specifically. FIG. 12 is a flow chart showing the image-feature extraction method according to the third embodiment. The processing shown in FIG. 12 is executed, for instance, in step S102 of FIG. 3 and in step S202 of FIG. 5.

The feature-extraction engine 152 in FIG. 2 receives an image as a target, and divides the image into regions each of which has the same color by clustering a color space based on an ordinary clustering method such as the shortest distance method (step S501: Extract an object by color clustering).

Generally the portions in the upper right and left corners of an image are integrated with the background of the image. Therefore, the feature-extraction engine 152 extracts the regions in the upper corners and identifies a cluster appearing most frequently in these corners as a cluster of a background area (step S502: Identify a background area).

After the background area is identified in step S502, the feature-extraction engine 152 separates an object from the image by removing the background area therefrom (step S503: Separate an object).

However, the cluster is not always a continuous area, and there are cases where a section of the cluster recognized as a background is included inside the object as shown in FIG. 13A. FIG. 13A shows a cluster in which the section 0 is recognized as a background. Therefore, the processing described below is carried out for removing the hole within the object.

At first, as shown in FIG. 13B, after separated clusters on an image are determined as different regions and labeled as such, clusters other than the cluster recognized as the background are integrated as shown in FIG. 13C. As shown in FIG. 13D, an object is separated by labeling.

The feature-extraction engine 152 executes the processing shown in FIG. 13A to FIG. 13D, and extracts the region whose area is the maximum among a plurality of object regions as an object. In FIG. 13D, the section indicated by 1 corresponds to the object.

After the object is separated from the image in step S503, the feature-extraction engine 152 executes the processing for extracting feature parameters from the separated object (step S504), and ends the processing. In the step S504, the feature-extraction engine 152 executes the processing for generating a color histogram as described in the first and second embodiments by targeting the object or extracting feature parameters from the object by using a method according to a fourth embodiment described later.

As described above, with the image-feature extraction method according to the third embodiment, by executing the processing for extracting an object from an image through removal of a background therefrom, the work to extract image-feature parameters from the image can be automated, so that a user-friendly work environment can be provided. In addition, image retrieval by object can be performed through extraction of feature parameters for each object. Further by extracting feature parameters for each object, image retrieval can be performed for each object, so that it is possible to realize the processing of high precision image retrieval for each of objects in an image which are considerably easy to remain in human's impressions. Namely, with the image-feature extraction method according to the third embodiment, there is provided the advantage that it is possible to obtain image-feature parameters suited to human sensibilities on similarity without requiring any heavy work load to an operator.

In the third embodiment, although the method of removing a background and separating an object from an image is described, in place of this method, a method of extracting an edge of an object in the image and separating the object from the image can also be used. The method is roughly described below. It is assumed in the following description that the background of the image is formed with substantially a single color and there is one object existing in the image.

Figure 14:
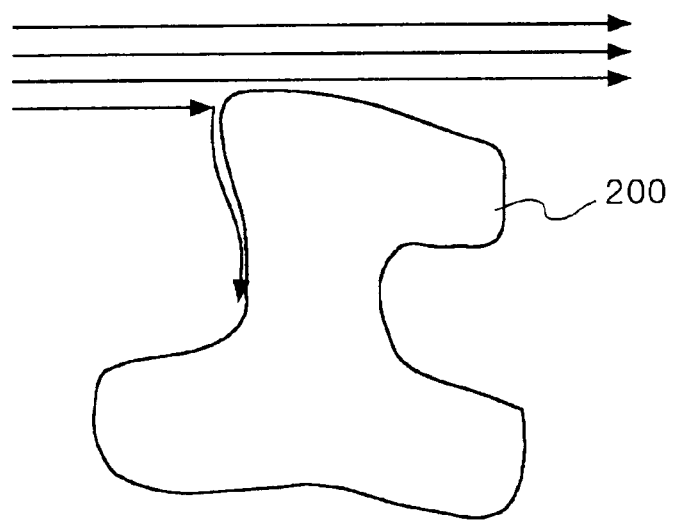
FIG. 14 is an explanatory view showing a modification of the processing for separating an object from an image in the image-feature extraction method according to the third embodiment of the present invention.

An edge filter like a Marr filter is used for extracting an edge of an object. Amplitude of the extracted edge is digitized using an appropriate threshold value. The object 200 can be separated from an image by starting an operation for searching an edge at any point in an area which can definitely be determined as a background, for instance, in the upper right and left edges of the image as shown in FIG. 14 and then by following an outline of the object 200 from the found edge as a start point.

An image-feature extraction method according to the fourth embodiment of the present invention is described below. In the fourth embodiment, a method of extracting the shape of the object separated from the image by employing the method of separating an object from an image or the like as feature parameters of the object as described in the third embodiment is described below. As configuration of the image retrieval system 100 and image retrieval software 107 is as the same as that described in the first embodiment with reference to FIG. 1 and FIG. 2, the processing for extracting the shape of the object as feature parameters is mainly described below.

Figure 15:
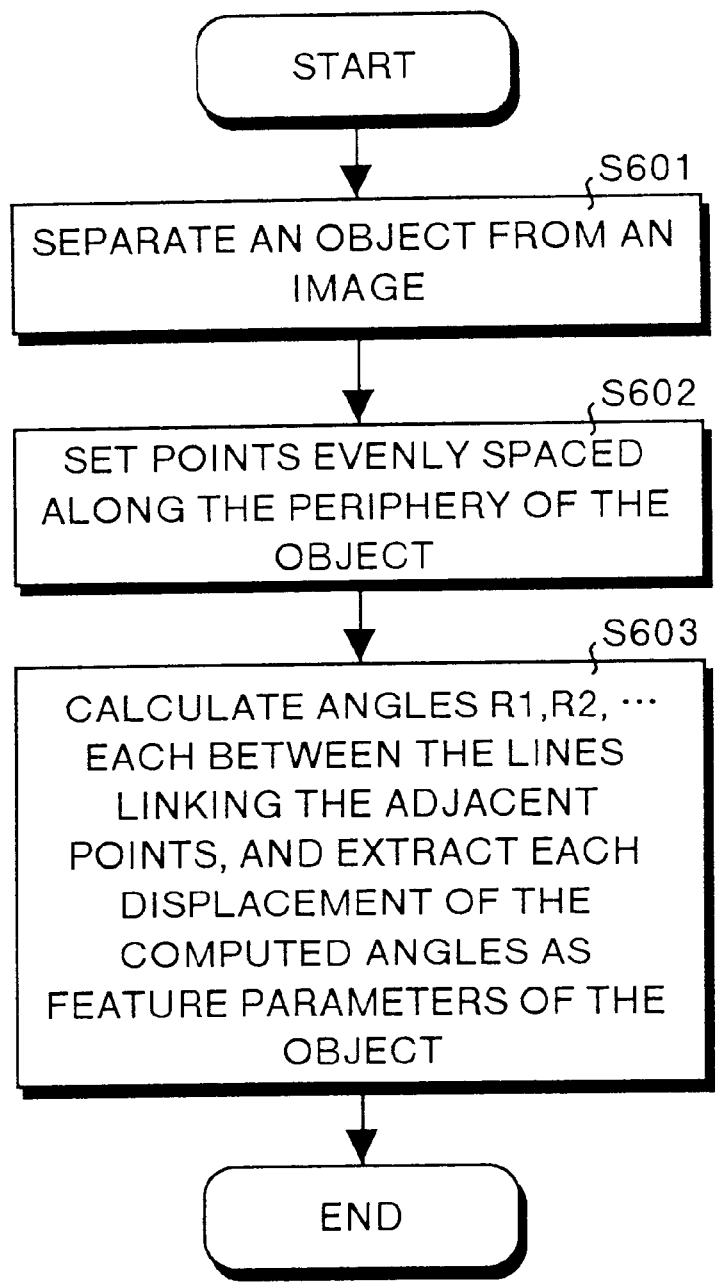
FIG. 15 is a flow chart showing the processing for image-feature extraction according to a fourth embodiment of the present invention.

FIG. 15 is a flow chart showing the processing for image-feature extraction according to the fourth embodiment. The processing shown in FIG. 9 is executed, for instance, in step S102 of FIG. 3 and in step S202 of FIG. 5. The feature-extraction engine 152 in FIG. 2 executes the processing for extracting an object from an image in step S601 by using the method described in the third embodiment, and extracting a shape of the object as feature parameters.

Figure 16:
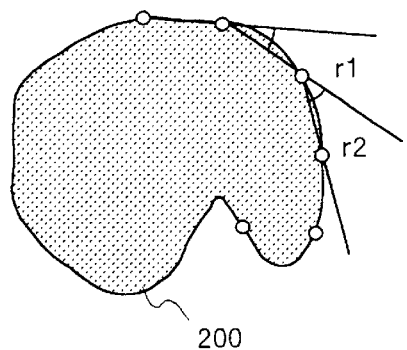
FIG. 16 is an explanatory view showing the processing for image-feature extraction according to the fourth embodiment of the present invention.

The feature-extraction engine 152 sets a plurality of points evenly spaced along the periphery of the object 200 as shown in FIG. 16 (step S602).

Figure 17:
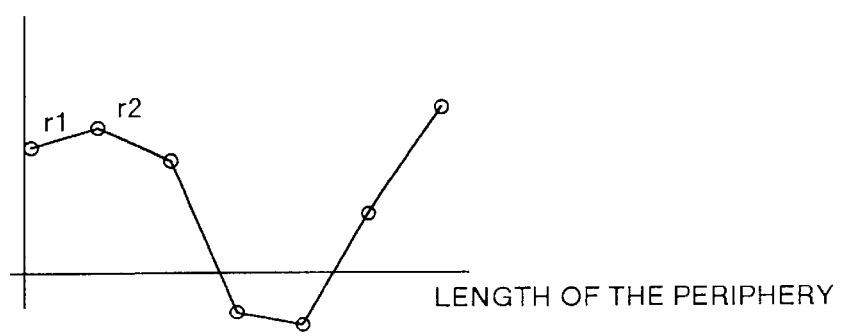
FIG. 17 is an explanatory view showing feature parameters representing the shape of an object obtained through the processing of image-feature extraction according to the fourth embodiment of the present invention.

The feature-extraction engine 152 then calculates angles r1, r2, . . . each between the lines linking the adjacent points, and extracts each displacement of the angles r1, r2, . . . to the peripheral length of the object 200 as feature parameters representing a shape of the object 200 as shown in FIG. 17

(step S603). Namely, the feature-extraction engine 152 extracts displacement of each angle between the lines linking the adjoining points, normalizes the points to a constant number of points, moves all of the points in the plus direction, and determines a vector obtained by removing a minus value therefrom as feature parameters.

In image retrieval, when the retrieval processing based on shape-features of an object is selected, the feature-extraction engine 152 executes the processing for extracting feature parameters of an object (shape-features) from a query image by executing the above-described processing. The search engine 153 executes the processing for computing similarity between object-feature parameters of the query image and object-feature parameters of an image as a target for retrieval. More specifically, as feature parameters based on shape features of an object are vector data as described above, in the feature space shown in FIG. 4, a space between object-feature parameters of a query image and object-feature parameters of an image as a target for retrieval is computed by using an equation for defining a vector range such as the Euclidean range. The U/I section 151 then displays the result of the processing by the search engine 153 on the screen as the result of retrieval.

As described above, with the image-feature extraction method according to the fourth embodiment, as shown in FIG. 17, each displacement of the angles r1, r2, ... to the peripheral length of the object 200 is extracted as feature parameters representing the shape of the object 200, so that the feature parameters satisfying human sensibility on similarity can be obtained. Namely, even minute irregularity such as concave and convex sections of an object can be extracted. Therefore, by executing the image retrieval using feature parameters obtained with the image-feature extraction method according to the fourth embodiment, an image satisfying human sensibility on similarity can be obtained as a result of retrieval.

As described above, the image-feature extraction method according to the present invention is realized by making a computer execute a prepared program according to sequence based on the above-described flow chart. The program can be provided as a portion of the image retrieval software 107 shown in FIG. 1 or other application programs, but the program can also be provided discretely. In addition, the program which realizes the image-feature extraction method can also be prepared and provided for each of the embodiments described above, and further the programs can also be prepared and provided in any combination.

Figure 18A:
FIG. 18A is an explanatory view showing a recording medium with a program for realizing the processing of image-feature extraction according to the present invention recorded therein.

The program is provided by being recorded in a computer-readable record medium such as a hard disk, a floppy disk, a CD-ROM, an MO, and a DVD. As shown in FIG. 18A, the program is read from a recording medium 250 by the CPU 101 (computer), and the CPU 101 executes the processing based on the program, through which the image-feature extraction method according to the present invention can be realized.

Figure 18B:
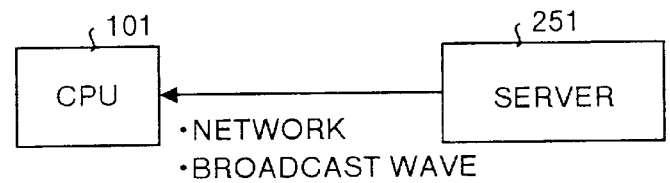
FIG. 18B shows how the program is distributed.

The program can also be downloaded, as shown in FIG. 18B, from a recording medium in a server 251 via a network such as the Internet and a LAN and executed by reading into the CPU 101. Further, the program can also be downloaded not only through the network but by using, for instance, the broadcast waves.

As described above, the image parameter extraction method according to the present invention comprises the steps of identifying to which area in a color space with a plurality of areas previously segmented thereinto each pixel belongs based on a color of each pixel which forms a prepared image; and generating a color histogram of the image based on the number of pixels which belong to each of the areas. When the generated color histogram is extracted as feature parameters representing features of the image, a color space which is suited to human sensibility on color and also which is segmented into areas each suited to human sensibility on color is used as a color space. Therefore, image-feature parameters suited to human sensibility on similarity can be extracted and also a high precision result of retrieval satisfying human sensibility on similarity can be obtained by using the extracted feature parameters. Namely, as the color space suited to human sensibility on color is used from the initial step, image-feature parameters suited to human sensibility on similarity can be extracted without requiring any heavy work load to an operator. In addition, by dividing a color space into a plurality of areas suited to human sensibility on color, a number of divisions of a color space can be suppressed to a minimum. As a result, the speed of image retrieval using a color histogram can be improved.

With the present invention, a biconical HSV space which is segmented into a plurality of areas is used as a color space, so that image-feature parameters suited to human sensibility on similarity can be extracted.

The image-feature extraction method according to another aspect of the present invention comprises the steps of identifying to which area in a color space with a plurality of areas previously segmented thereinto each pixel belongs based on a color of each pixel which forms a prepared image; generating a color histogram of the image based on the number of pixels which belong to each of the areas; when the generated color histogram is extracted as feature parameters representing features of the image then accumulating a number of pixels belonging to other areas in the number of pixels belonging to each of the areas according to color similarity between the areas; and generating a color histogram based on the number of pixels belonging to each of the areas after accumulation thereof. Therefore a correlation between bins is reflected to the generated color histogram, so that the processing for retrieval suited to human sensibility on color can be performed. In addition, a high precision result of retrieval satisfying human sensibility on similarity can be obtained by using the feature parameters. Namely, since a correlation between bins can automatically be checked and identified by a program, image-feature parameters suited to human sensibility on similarity can be extracted without requiring any heavy work load to an operator. As a correlation between bins is checked and identified when a color histogram is generated, the bins may simply be compared to each other one to one in computing similarity between the images, so that the speed in computing similarity can be increased.

The image feature extraction method according to another aspect of the present invention comprise the steps of identifying to which area in color space with a plurality of areas previously segmented thereinto each pixel belongs based on a color of each pixel which forms a prepared image; generating a color histogram of the image based on the number of pixels belonging to each of the areas; when the generated color histogram is extracted as feature parameters representing features of the image then previously setting a typical color of each of the areas; computing similarity between a color of each pixel and a typical color of each area; and determining a number of pixels which belong to each of the areas according to the computed similarity. Therefore a correlation between bins is reflected to the generated color histogram, and the processing for retrieval suited to human sensibility on color can be performed. In addition, a high precision result of retrieval suited to human sensibility on similarity can be obtained by using the feature parameters. Namely, since a correlation between bins in the above-described method can automatically be checked and identified by a program, image-feature parameters suited to human sensibility on similarity can be extracted without requiring any heavy work load to an operator. As a correlation between bins is reflected to the generated color histogram, when similarity between images is to be computed, the bins may simply be compared to each other one to one, so that the speed of computing similarity can be increased.

The image feature extraction method according to another aspect of the present invention comprises the steps of extracting an object from a prepared image; when feature parameters representing features of an object are extracted from the extracted object then setting points evenly spaced along an outline of the extracted object; computing displacement of an angle formed with lines linking between adjacent points; and extracting each computed displacement of the angles as feature parameters of the object. Therefore image-feature parameters suited to human sensibility on similarity can be extracted, and also a high precision result of retrieval satisfying human sensibility on similarity can be obtained. Namely, since feature parameters of an object can automatically be extracted by a program in the method as described above, image-feature parameters satisfying human sensibility on similarity can be extracted without requiring any heavy work load to an operator.

The image-feature extraction method according to another aspect of the present invention comprises the steps of extracting an object from a prepared image; when feature parameters representing features of an object are extracted from the extracted object then extracting a color of each pixel which forms the image and clustering the colors in a color space; identifying any of the clusters obtained by the clustering including a color appearing most frequently in a previously specified area of the image as a cluster for a background area of the image; and extracting an area of the image formed with colors which belong to the clusters other than the identified cluster as an object. Therefore the work to extract image-feature parameters from the image can be automated. In addition, image retrieval by object can be performed through extraction of feature parameters by object, so that it is possible to realize the processing for high precision image retrieval for an object which is considerably easy to remain in human's impressions.

The image-feature extraction method according to another aspect of the present invention comprises the steps of extracting an object from a prepared image; when feature parameters representing features of an object are extracted from the extracted object then extracting a color of each pixel which forms the image and clustering the colors in a color space; identifying any of the clusters obtained by the clustering including a color appearing most frequently in areas corresponding to upper left-hand part and upper right-hand part of the image as a cluster for a background area of the image; and extracting an area of the image formed with colors which belong to the clusters other than the identified cluster as an object, so that the background can extremely easily be removed from the image. Therefore, the processing for extracting an object from an image can easily be performed.

The image-feature extraction method according to another aspect of the present invention comprises the steps of extracting an object from a prepared image; when feature parameters representing features of an object are extracted from the extracted object then extracting a color of each pixel which forms the image and clustering the colors in a color space; identifying any of the clusters obtained by the clustering including a color appearing the most in a previously specified area of the image as a cluster for a background area of the image; and extracting an area of the image formed with colors which belong to the clusters other than the identified cluster as an object. Thus method further includes the step of extracting feature parameters of the extracted object by employing the image-feature extraction method described above, so that feature parameters of an object suited to human sensibility can be extracted, and also the processing for high precision retrieval by object suited to human sensibility can be realized by using the extracted feature parameters.

With the present invention, a program for making a computer execute the steps of the image-feature extraction method as described above is recorded in a computer-readable record medium. Therefore, through execution of the program by a computer, image-feature parameters suited to human sensibility on colors can be extracted, and also a high precision result of retrieval satisfying human sensibility on similarity can be obtained by using the extracted feature parameters.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image-feature extraction method comprising the steps of:

identifying to which area in a color space with a plurality of areas previously segmented thereinto each pixel belongs based on a color of each pixel constituting a prepared image;

generating a color histogram of the image based on a number of pixels which belong to each of the areas; and extracting the generated color histogram as feature parameters representing features of the image; wherein the color space is a color space which is suited to human sensibility for colors and also is segmented into areas in units suited to human sensibility for colors.

2. The image-feature extraction method according to claim 1, wherein said color space is a biconical HSV space which is segmented into a plurality of areas.

3. An image-feature extraction method comprising the steps of:

identifying to which area in a color space with a plurality of areas previously segmented thereinto each pixel belongs based on a color of each pixel which forms a prepared image;

generating a color histogram of the image based on a number of pixels which belong to each of the areas; and extracting the generated color histogram as feature parameters representing features of the image;

accumulating a number of pixels which belong to other areas in the number of pixels which belong to each of the areas according to color similarity between the areas; and generating a histogram of the color based on the number of pixels which belong to each of the areas after accumulation thereof.

4. An image-feature extraction method comprising the steps of:

identifying to which area in a color space with a plurality of areas previously segmented thereinto each pixel belongs based on a color of each pixel which forms a prepared image;

generating a color histogram of the image based on a number of pixels which belong to each of the areas; and extracting the generated color histogram as feature parameters representing features of the image;

previously setting typical colors of the area;

computing similarity between a color of each of the pixels and a typical color of each area; and determining a number of pixels which belong to each of the areas according to the computed similarity.

5. An image-feature extraction method comprising the steps of:

extracting an object from a prepared image;

extracting feature parameters representing features of an object from the extracted object;

setting points evenly spaced along an outline of the extracted object;

computing the displacement of the angle between the lines that link the adjacent points; and extracting each computed displacement of the angles as feature parameters of the object.

6. An image-feature extraction method comprising the steps of:

extracting an object from a prepared image;

extracting feature parameters representing features of the object from the extracted object;

extracting a color of each pixel which forms the image;

clustering the extracted colors in a color space;

identifying any cluster, of the clusters obtained in the clustering step, including a color appearing the most frequently in a previously specified area of the image as a cluster for a background area of the image; and extracting an area of the image formed with colors which belong to the clusters other than the identified cluster as the object.

7. The image-feature extraction method according to claim 6, wherein the previously specified area includes areas corresponding to the upper left and upper right corners of the image.

8. An image-feature extraction method comprising the steps of:

extracting an object from a prepared image;

extracting feature parameters representing features of the object from the extracted object;

extracting a color of each pixel which forms the image;

clustering the extracted colors in a color space;

identifying any cluster, of the clusters obtained in the clustering step, including a color appearing the most frequently in a previously specified area of the image as a cluster for a background area of the image; and extracting an area of the image formed with colors which belong to the clusters other than the identified cluster as the object;

wherein the feature parameters of the extracted object are extracted using the steps of, identifying to which area in a color space with a plurality of areas previously segmented thereinto each pixel belongs based on a color of each pixel constituting a prepared image;

generating a color histogram of the image based on a number of pixels which belong to each of the areas; and extracting the generated color histogram as feature parameters representing features of the image; wherein the color space is a color space which is suited to human sensibility for colors and also is segmented into areas in units suited to human sensibility for colors.

9. The image-feature extraction method according to claim 8, wherein the previously specified area includes areas corresponding to the upper left and upper right corners of the image.

10. An image-feature extraction method comprising the steps of:

extracting an object from a prepared image;

extracting feature parameters representing features of the object from the extracted object;

extracting a color of each pixel which forms the image;

clustering the extracted colors in a color space;

identifying any cluster, of the clusters obtained in the clustering step, including a color appearing the most frequently in a previously specified area of the image as a cluster for a background area of the image; and extracting an area of the image formed with colors which belong to the clusters other than the identified cluster as the object;

wherein the feature parameters of the extracted object are extracted using the steps of, identifying to which area in a color space with a plurality of areas previously segmented thereinto each pixel belongs based on a color of each pixel which forms a prepared image;

generating a color histogram of the image based on a number of pixels which belong to each of the areas; and extracting the generated color histogram as feature parameters representing features of the image;

accumulating a number of pixels which belong to other areas in the number of pixels which belong to each of the areas according to color similarity between the areas; and generating a histogram of the color based on the number of pixels which belong to each of the areas after accumulation thereof.

11. The image-feature extraction method according to claim 10, wherein the previously specified area includes areas corresponding to the upper left and upper right corners of the image.

12. An image-feature extraction method comprising the steps of:

extracting an object from a prepared image;

extracting feature parameters representing features of the object from the extracted object;

extracting a color of each pixel which forms the image;

clustering the extracted colors in a color space;

identifying any cluster, of the clusters obtained in the clustering step, including a color appearing the most frequently in a previously specified area of the image as a cluster for a background area of the image; and extracting an area of the image formed with colors which belong to the clusters other than the identified cluster as the object;

wherein the feature parameters of the extracted object are extracted using the steps of, identifying to which area in a color space with a plurality of areas previously segmented thereinto each pixel belongs based on a color of each pixel which forms a prepared image;

generating a color histogram of the image based on a number of pixels which belong to each of the areas; and extracting the generated color histogram as feature parameters representing features of the image;

previously setting typical colors of the area;

computing similarity between a color of each of the pixels and a typical color of each area; and determining a number of pixels which belong to each of the areas according to the computed similarity.

13. The image-feature extraction method according to claim 12, wherein the previously specified area includes areas corresponding to the upper left and upper right corners of the image.

14. An image-feature extraction method comprising the steps of:

extracting an object from a prepared image;

extracting feature parameters representing features of the object from the extracted object;

extracting a color of each pixel which forms the image;

clustering the extracted colors in a color space;

identifying any cluster, of the clusters obtained in the clustering step, including a color appearing the most frequently in a previously specified area of the image as a cluster for a background area of the image; and extracting an area of the image formed with colors which belong to the clusters other than the identified cluster as the object;

wherein the feature parameters of the extracted object are extracted using the steps of, extracting an object from a prepared image;

extracting feature parameters representing features of an object from the extracted object;

setting points evenly spaced along an outline of the extracted object;

computing the displacement of the angle between the lines that link the adjacent points; and extracting each computed displacement of the angles as feature parameters of the object.

15. The image-feature extraction method according to claim 14, wherein the previously specified area includes areas corresponding to the upper left and upper right corners of the image.

16. A computer-readable record medium with a program for making a computer execute the steps of the image-feature extraction method, which image-feature extraction method comprising the steps of:

identifying to which area in a color space with a plurality of areas previously segmented thereinto each pixel belongs based on a color of each pixel which forms a prepared image;

generating a color histogram of the image based on a number of pixels which belong to each of the areas; and extracting the generated color histogram as feature parameters representing features of the image; wherein the color space is a color space which is suited to human sensibility for colors and also is segmented into areas in units suited to human sensibility for colors.

17. A computer-readable record medium with a program for making a computer execute the steps of the image-feature extraction method, which image-feature extraction method comprising the steps of:

identifying to which area in a color space with a plurality of areas previously segmented thereinto each pixel belongs based on a color of each pixel which forms a prepared image;

generating a color histogram of the image based on a number of pixels which belong to each of the areas; and extracting the generated color histogram as feature parameters representing features of the image;

accumulating a number of pixels which belong to other areas in the number of pixels which belong to each of the areas according to color similarity between the areas; and generating a histogram of the color based on the number of pixels which belong to each of the areas after accumulation thereof.

18. A computer-readable record medium with a program for making a computer execute the steps of the image-feature extraction method, which image-feature extraction method comprising the steps of:

identifying to which area in a color space with a plurality of areas previously segmented thereinto each pixel belongs based on a color of each pixel which forms a prepared image;

generating a color histogram of the image based on a number of pixels which belong to each of the areas; and extracting the generated color histogram as feature parameters representing features of the image;

previously setting typical colors of the area;

computing similarity between a color of each of the pixels and a typical color of each area; and determining a number of pixels which belong to each of the areas according to the computed similarity.

19. A computer-readable record medium with a program for making a computer execute the steps of the image-feature extraction method, which image-feature extraction method comprising the steps of:

extracting an object from a prepared image;

extracting feature parameters representing features of an object from the extracted object;

setting points evenly spaced along an outline of the extracted object;

computing the displacement of the angle between the lines that link the adjacent points; and extracting each computed displacement of the angles as feature parameters of the object.

20. A computer-readable record medium with a program for making a computer execute the steps of the image-feature extraction method, which image-feature extraction method comprising the steps of:

extracting an object from a prepared image;

extracting feature parameters representing features of the object from the extracted object;

extracting a color of each pixel which forms the image;

clustering the extracted colors in a color space;

identifying any cluster, of the clusters obtained in the clustering step, including a color appearing the most frequently in a previously specified area of the image as a cluster for a background area of the image; and extracting an area of the image formed with colors which belong to the clusters other than the identified cluster as the object.

21. An apparatus comprising the computer-readable record medium of any one of claims 16–20, wherein said apparatus includes a personal computer or a work station.

22. An image data method comprising the steps of:

identifying to which area in a color space with a plurality of areas previously segmented thereinto each pixel belongs based on a color of each pixel constituting a first image;

generating a color histogram of the image based on a number of pixels which belong to each of the areas;

extracting the generated color histogram as feature parameters for said first image; wherein the color space is a color space which is suited to human sensibility for colors and also is segmented into areas in units suited to human sensibility for colors; and comparing said feature parameters for said first image to feature parameters for a second image.

23. The method of claim 22, further comprising the step of storing said feature parameters for said second image in an image feature database.

24. The method of claim 23, further comprising the step of retrieving said second image in response to said feature parameters for said second image being similar to said feature parameters for said first image.

* * * * *